(12) United States Patent
Drinovec et al.

(10) Patent No.: US 10,768,088 B2
(45) Date of Patent: Sep. 8, 2020

(54) PHOTO-THERMAL INTERFEROMETER

(71) Applicant: Volumen d.o.o., Ljubljana (SI)

(72) Inventors: Luka Drinovec, Ljubljana (SI); Grisa Mocnik, Ljubljana (SI)

(73) Assignee: Volumen d.o.o., Ljubljana (SI)

( * ) Notice: Subject to any disclaimer, the term of this patent is extended or adjusted under 35 U.S.C. 154(b) by 44 days.

(21) Appl. No.: 16/202,561

(22) Filed: Nov. 28, 2018

(65) Prior Publication Data

US 2019/0162643 A1    May 30, 2019

(30) Foreign Application Priority Data

Nov. 30, 2017   (EP) .................................... 17204634

(51) Int. Cl.
| | |
|---|---|
| *G01N 21/45* | (2006.01) |
| *G01N 21/17* | (2006.01) |
| *G01N 15/06* | (2006.01) |
| *G01J 3/453* | (2006.01) |
| *G01N 21/63* | (2006.01) |
| *G02B 5/00* | (2006.01) |
| *G01N 15/00* | (2006.01) |

(52) U.S. Cl.
CPC .............. *G01N 15/06* (2013.01); *G01J 3/453* (2013.01); *G01J 3/4531* (2013.01); *G01N 21/171* (2013.01); *G01N 21/45* (2013.01); *G01N 21/636* (2013.01); *G02B 5/001* (2013.01); *G01N 2015/0046* (2013.01); *G01N 2015/0693* (2013.01); *G01N 2021/451* (2013.01)

(58) Field of Classification Search
CPC .. G01B 9/02; G01B 9/02003; G01B 9/02007; G01B 9/02035; G01N 21/1702; G01N 21/45; G01N 2021/1704; G01N 2021/451
See application file for complete search history.

(56) References Cited

U.S. PATENT DOCUMENTS

| 2,759,393 A | 8/1956 | McLeod |
|---|---|---|
| 2007/0123761 A1 | 5/2007 | Daly et al. |

(Continued)

OTHER PUBLICATIONS

Castillo, "Axicons in Action—Unique Wavefront Sensing for Adaptive Optics," *Optik & Photonik*, 36-39, 2016.

(Continued)

*Primary Examiner* — Jonathan M Hansen
(74) *Attorney, Agent, or Firm* — Norton Rose Fulbright US LLP

(57) ABSTRACT

A photo-thermal interferometer for measuring the light absorption of an aerosol or gas comprises a first laser source emitting a laser beam and a beam splitter adapted to divide the laser beam into a probe beam and a reference beam. The interferometer further comprises first optical elements which are adapted to direct the probe beam such that it passes through the aerosol and interferes with the reference beam thereafter thereby causing interference patterns. A detector detects the interference patterns. The interferometer further comprises a second laser source configured to emit a pump beam for transferring energy to the aerosol. Second optical elements are adapted to direct the pump beam such that it overlaps with the probe beam at least partially in the aerosol or gas. At least one of the second optical elements modifying the pump beam is an axicon.

10 Claims, 3 Drawing Sheets

(56) References Cited

U.S. PATENT DOCUMENTS

2016/0260513 A1     9/2016   Pan et al.
2017/0299508 A1* 10/2017   Jin ........................ G01N 21/39

OTHER PUBLICATIONS

European Search Report Issued in European Application No. EP17204634, dated May 9, 2018.
Owens, et al., "A Photothermal Interferometer for Gas-Phase Ammonia Detection," *Analytical Chemistry, American Chemical Society*, 71(7); 1391-1399, 1999.
Sedlacek & Lee, "Photothermal Interferometric Aerosol Absorption Spectrometry," *Aerosol Science and Technology*, 41; 1089-1101, 2007.
Sedlacek, "Real-Time Detection of Ambient Aerosols Using Photothermal Interferometry: Foled Jamin Interferometer," *Review of Scientific Instruments*, 77,; 064903, 2006.
Sjorgen, "Photothermal Interferometry for Aerosol Absorption Measurements," University of Applied Sciences and Arts Northwestern Switzerland School of Engineering, 20th ETH Conference on Combusttion Generated Nanoparticles, Poster Session 3: Instrumentation, 2016, accessed at http://www.nanoparticles.ch/archive/2016_Sjoegren_PO.pdf.

* cited by examiner

PHOTO-THERMAL INTERFEROMETER

CROSS-REFERENCE TO RELATED APPLICATIONS

This application claims the benefit of priority of European Patent Application No. EP17204634 filed Nov. 30, 2017, which is hereby incorporated by reference in its entirety.

TECHNICAL FIELD

The present invention relates to a photo-thermal interferometer for measuring the light absorption of a sample containing aerosols or gases. Moreover, the present invention also relates to a method for measuring the light absorption of a sample containing aerosols or gases.

BACKGROUND OF THE INVENTION

Light absorption measurements of aerosols by use of a photo-thermal interferometer are for example used to determine the concentration of black carbon particles (BC particles) dispersed in air. BC particles are highly efficient light absorbers, which are for example emitted by combustion processes. Light absorption by BC particles is central to climate change, as elevated BC particles are the second man-made contributor (after $CO_2$) to global warming. Moreover, BC particles also affect public health as these particles are inhaled deeply and associated with lung and cardiovascular disease. However, photo-thermal interferometers may also be used for example to measure other absorbing aerosols, e.g. mineral dust and organic compounds, or gases.

In connection with the present invention the term "aerosol" has to be understood as a colloid of fine solid particles or liquid droplets dispersed in air or another gas. Regarding BC particles as mentioned above an aerosol comprises BC particles dispersed in air.

A photo-thermal interferometer exemplified in a Mach-Zehnder configuration which forms the basis of the preamble of claim 1 is for example disclosed in "Photothermal interferometry for aerosol absorption measurements, S. Sjogren, E. Weingartner and H. Burtscher, http://www.nano-particles.ch/archive/2016_Sjoegren_PO.pdf". The Mach-Zehnder interferometer is a device with a first light source emitting a light beam which is divided into a reference beam and a probe beam. Both beams pass through an aerosol or gas which is an aerosol or gas sample. The aerosol sample contains air and BC particles dispersed therein. The gas sample may contain an absorbing gas or gases. The probe beam is superimposed by a pump beam which is emitted by a second light source. After passing the aerosol or gas sample the reference beam and the probe beam interfere with each other thereby causing interference patterns which are recorded by a detector.

Photo-thermal interferometry (PTI) is based on the measurement of small temperature changes within the aerosol or gas sample caused by energy emitted by the second light source (pump beam). When the radiation of the pump beam is absorbed by the particles such as the BC particles or by the absorbing gases, the absorbed energy results in a temperature increase of the particles or the absorbing gases, causing heat to be transferred to the surrounding air of the particles in the aerosol sample or within the absorbing gases of the gas sample. The air heats up locally in the area of highest pump beam intensity, and the gas density around the particles in this area is lowered. This results in a local change of the refractive index of the air within the aerosol or gas sample. The refractive index change is measured as a change in the phase shift between the reference beam and the probe beam when reaching the detector.

Based on the measured phase shift of the reference beam and the probe beam an aerosol or gas sample absorption coefficient may be calculated which is linearly related to the measured phase shift and only depends on the power of the second laser source, the pump-probe beam configuration geometry and the thermal properties of the air.

According to theoretical calculations taking only detector noise into account a very low detection limit in the phase change of 0.02 microradians can be achieved with photo-thermal interferometers at 1 Hz bandwidth (Real-time detection of ambient aerosols using photothermal interferometry: Folded Jamin interferometer, Sedlacek, 2006, BNL-77007-2006-JA). However, the actual PTI instrument sensitivity is much lower (Photothermal Interferometric Aerosol Absorption Spectrometry, Sedlacek and Lee, 2007, ISSN: 0278-6826).

It is an object of the present invention to provide a photo-thermal interferometer which enables measurement of the light absorption of aerosols and gases with an increased sensitivity.

SUMMARY OF THE INVENTION

This object is achieved by a photo-thermal interferometer comprising the features of claim 1. Preferred embodiments are set out in the dependent claims.

According to the present invention, at least one of the optical elements modifying the pump beam is an axicon.

In connection with the present invention the term "axicon" has to be understood as bodies of revolution which have the property that a point source on its axis of revolution is imaged to a range of points along its axis of revolution. Axicons do not have a definite focal length but rather have an extended focal line.

In connection with the present invention it has been found that the sensitivity with which measurements can be made depends on the distance along which the density of the aerosol or gas sample is decreased by the pump beam and thus the refractive index is changed. Moreover, as the density and the refractive index of the aerosol or gas sample are changed only locally the sensitivity also depends on the overlap between the pump and probe beams.

The photo-thermal interferometer according to the present invention includes different types of interferometers such as for example Michelson, Mach-Zehnder, folded Jamin and other. Accordingly, the axicon according to the present invention may be used in combination with these different types of interferometers such as for example Michelson, Mach-Zehnder, folded Jamin and other.

According to an embodiment of the present invention the axicon is arranged to modify the pump beam such that it is imaged into a longitudinally extended focal line on an optical axis of the axicon. The axicon is positioned such that the pump beam overlaps with the probe beam in the longitudinally extended focal line of the axicon. This allows to provide a pump beam which has a more or less constant intensity along the longitudinally focal line on the optical axis of the axicon. The term "more or less constant" has to be understood such that the intensity of the pump beam varies up to +−20%, preferably up to +−10% of the maximum intensity. In connection with the present invention it has been found that the longitudinally extended focal line onto which the pump beam is imaged when passing through the axicon may preferably have a length of several 10 cm, up to half a meter, more preferably from 20 cm to 50 cm, most preferably from 30 cm to 50 cm.

According to another embodiment of the present invention the axicon is positioned outside of an interferometer axis along which the probe beam passes through the aerosol or gas. By arranging the axicon outside the interferometer axis it is omitted that the probe beam hits the axicon. Thus, a possible modification of the probe beam by the axicon is omitted.

Preferably the axicon has an optical axis and is positioned such that the optical axis is aligned with the probe beam passing through the aerosol or gas. By positioning the axicon along the probe beam the space needed for the arrangement of the optical elements is reduced. Thus the space needed for the photo-thermal interferometer at all can be reduced.

Also preferred is an embodiment according to which the axicon has a central aperture extending along its optical axis through the axicon. Preferably the aperture extends through the entire axicon along its optical axis such that the probe beam may pass the axicon without being affected. The aperture may be formed as a drill-hole or a cut out.

According to an embodiment of the present invention the axicon comprises an entry surface through which the pump beam enters the axicon and an exit surface through which the pump beam exits the axicon, wherein the entry surface or the exit surface has the shape of a cone or a truncated cone. Preferably the exit surface of the axicon has the shape of a truncated cone. Optionally the truncated cone has a top surface facing away from the entry surface of the axicon. The diameter of the top surface influences the distance between the axicon and the beginning of the longitudinally extended line along the optical axis of the axicon onto which the pump been is imaged.

Preferably a mask is positioned in front of the axicon such that a part of the pump beam is blocked before entering the axicon. This allows to define the shape of the pump beam and the area of the aerosol or gas sample onto which the pump been is imaged by the axicon.

According to another embodiment a diffuser is positioned in front of the axicon such that the pump beam after passing the diffuser enters the axicon. The diffuser may be used to widen the pump beam. Preferably the pump beam when passing the axicon and being imaged into a longitudinally extended focal line on the optical axis of the axicon has a tube-like shape with a diameter and a length. By use of a diffuser the diameter of the tube-like shaped pump beam can be widened. Moreover, the length of the tube-like shaped pump beam can be modified, in particular increased.

Preferably the axicon is a non-imaging Fresnel-lens. As Fresnel-lenses are a type of compact lenses the mass as well the volume of the axicon can be lowered.

In another embodiment of the present invention the optical elements are further adapted to improve an overlap of the pump beam with the probe beam. In connection with the present invention the term "to improve an overlap of the pump beam with the probe beam" has to be understood as to increase the pump beam and probe beam intensities integrated over a common tubular volume enveloping the beams. This allows to increase an interaction area along the beam propagation direction of the pump beam and the probe beam in which the pump beam changes the refractive index of the sample containing aerosol or gas and the probe beam is phase shifted due to the changed refractive index.

The present invention also relates to a method for measuring the light absorption of an aerosol or gas sample by use of a photo-thermal interferometer as described above.

According to an embodiment of the method according to the present invention the axicon is chosen such that it images the pump beam into a longitudinally extended focal line on an optical axis of the axicon and, that the axicon is positioned such that the pump beam overlaps with the probe beam in the longitudinally extended focal line of the axicon. This allows to provide a pump beam which has a more or less constant intensity along the longitudinally focal line on the optical axis of the axicon. Optionally the longitudinally extended focal line onto which the pump beam is imaged when passing through the axicon may preferably have a length of several 10 cm, up to half a meter, more preferably from 20 cm to 50 cm, most preferably from 30 cm to 50 cm.

The invention will now be described in connection with several exemplary embodiments shown in the figures in which:

FIG. 1 shows a photo-thermal interferometer 1 in the form of a Michelson interferometer which is adapted to measure the light absorption of an aerosol or gas, in particular an aerosol or gas sample 2 (FIG. 2).

Figure 1:
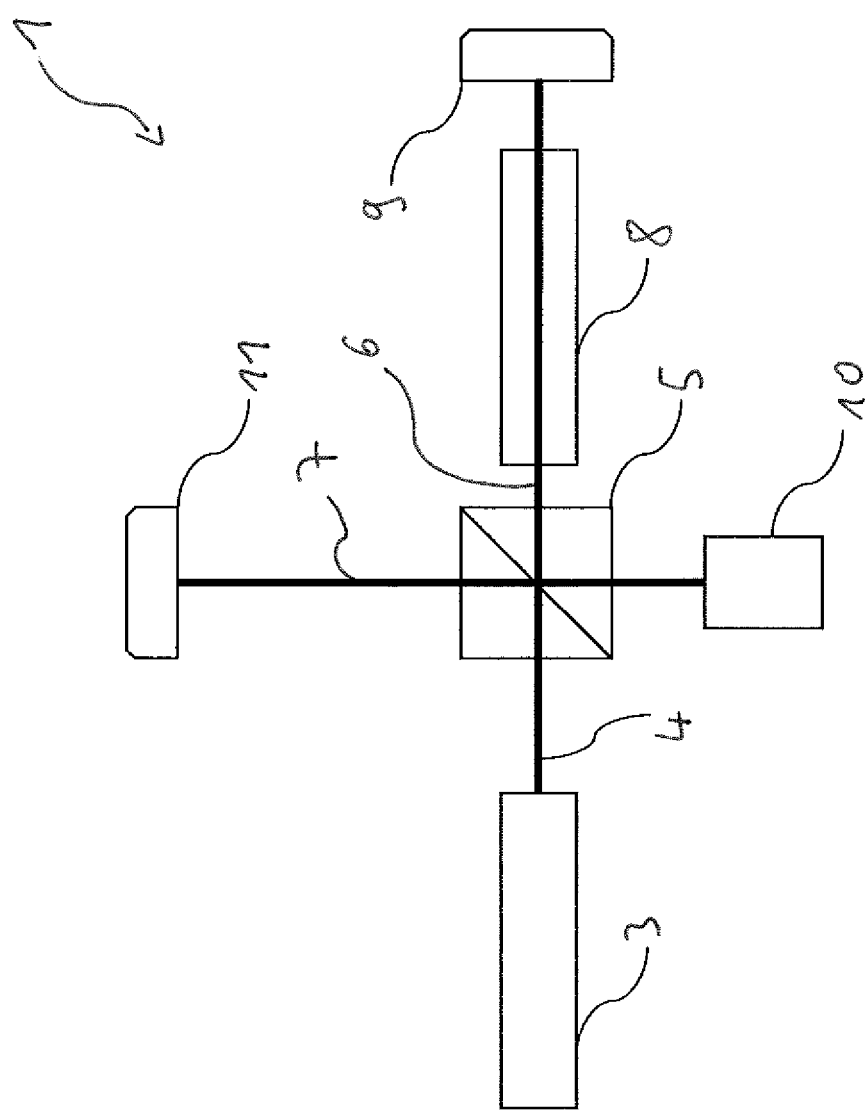
FIG. 1 shows a schematic view of a photo-thermal interferometer according to the present invention.

As described above the present invention is not limited to the Michelson interferometers but may also be realized in combination with other types of interferometer such as for example Mach-Zehnder, folded Jamin and others. Moreover, in connection with the present invention the term "aerosol" has to be understood as a colloid comprising particles dispersed in a gas such as air. In the present embodiment of the interferometer 1 shown in FIGS. 1 and 2 the aerosol or gas sample 2 contains black carbon particles (BC particles) which are dispersed in air.

The interferometer 1 comprises a first laser source 3 emitting a laser beam 4 and a beam splitter 5 adapted to divide the laser beam 4 into a probe beam 6 and a reference beam 7. The beam splitter 5 forms a first optical element which is adapted to direct the probe beam 6 such that it passes through a measurement chamber 8 and an aerosol or gas sample 2 (FIG. 2) located therein. Another first optical element such as a mirror 9 is adapted to reflect the probe beam 6 hitting thereon such that the probe beam 6 is returned through the aerosol or gas sample 2 towards the beam splitter 5 and is directed towards a detector 10 thereafter.

The interferometer 1 further comprises a mirror 11 which is configured to reflect the reference beam 7 such that the reference beam 7 is directed towards the beam splitter 5 and towards a detector 10 thereafter.

The detector 10 is adapted to record interference patterns which are generated by the probe beam 6 and the reference beam 7 interfering with each other when being directed by the beam splitter 5 towards the detector 10.

Figure 2:
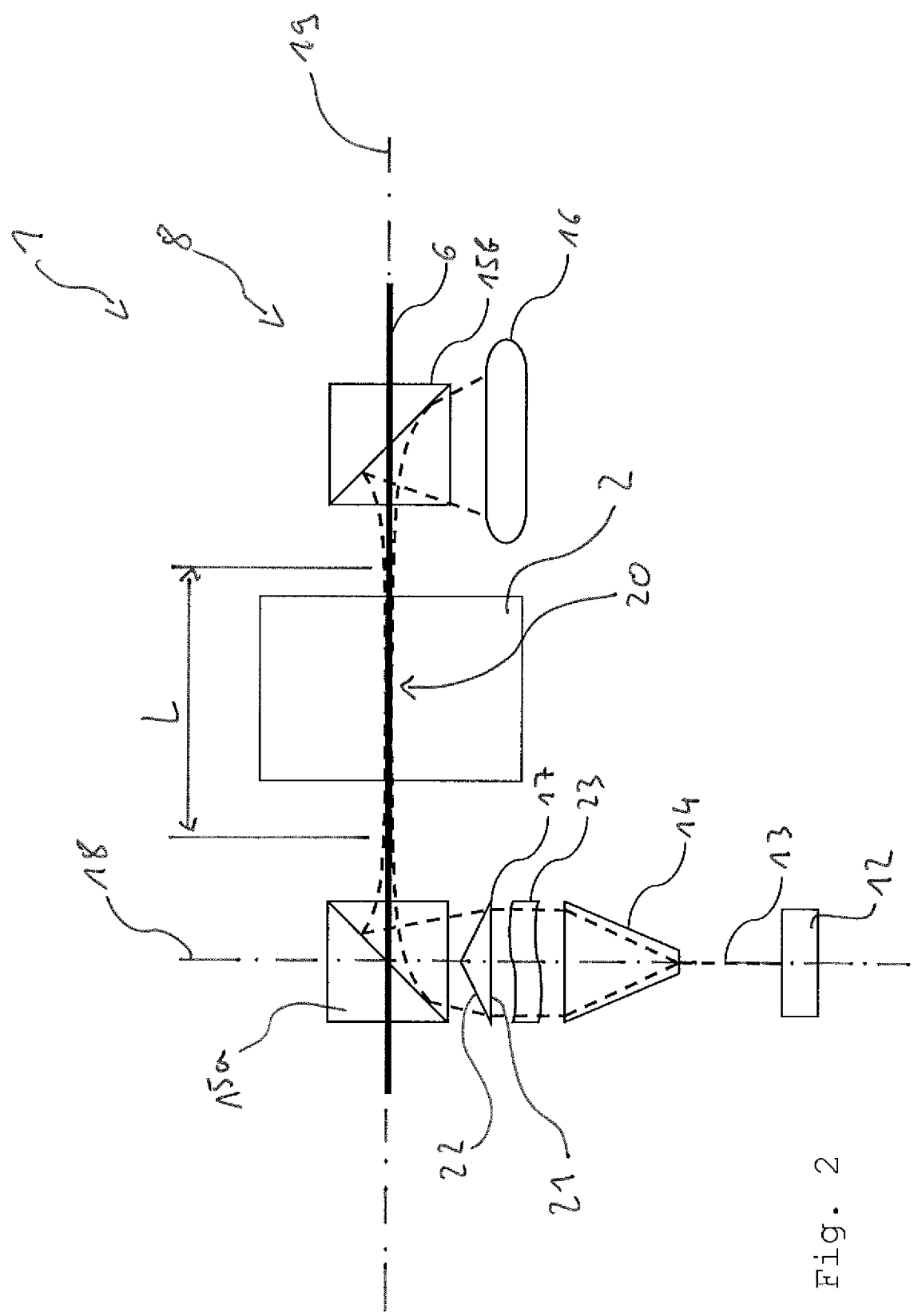
FIG. 2 shows a measurement chamber according to FIG. 1 in detail and FIG. 3 shows a second embodiment of a photo-thermal interferometer according to the present invention.

FIG. 2 shows a detailed schematic view of the measurement chamber 8 in which the aerosol or gas sample 2 is located.

A second laser source 12, which might be located inside or outside the measuring chamber 8 is configured to emit a pump beam 13 for transferring energy to the aerosol or gas sample 2. The second optical elements such as the beam expander 14 and dichroic mirrors 15a, 15b are adapted to direct the pump beam 13 such that it overlaps with the probe beam 6 at least partially in the aerosol or gas sample 2. A light trap 16 is adapted to trap the pump beam 13 after being directed away from the probe beam 6 by the dichroic mirror 15b.

One of the second optical elements modifying the pump beam 13 is an axicon 17. The axicon 17 is arranged to modify the pump beam 13 such that it is imaged into a longitudinally extended focal line on an optical axis 18 of the axicon 17. The axicon 17 is positioned such that the pump beam 13 overlaps with the probe beam 6 in the longitudinally extended focal line of the axicon 17. The axicon 17 is positioned outside of an interferometer axis 19 along which the probe beam 6 passes through the aerosol or gas sample 2.

The axicon 17 is adapted to increase the pump beam 13 and probe beam 6 intensities integrated over a common tubular volume enveloping the beams 13, 6. The longitudinally extended focal line of the axicon 17 falls within the interaction area 20. Both the longitudinally extended focal line and the interaction area 20 extend along the length L. The length L amounts from several 10 cm up to half a meter, preferably from 20 cm to 50 cm, most preferably from 30 cm to 50 cm. Along the longitudinally extended focal line the intensity of the pump beam is more or less constant.

The axicon 17 comprises an entry surface 21 through which the pump beam 13 enters the axicon 17 and an exit surface 22 through which the pump beam 13 exits the axicon 17. The exit surface 22 has the shape of a cone. However, the exit surface 22 may also have the shape of a truncated cone (not shown). Moreover, the axicon 17 may be a non-imaging Fresnel-lens.

A mask and/or a diffuser, shown in FIG. 2 as a beam shaping optic 23, may be positioned in front of the axicon 17 such that the pump beam 13 after being at least partially blocked and/or having passed the diffuser enters the axicon 17.

Figure 3:
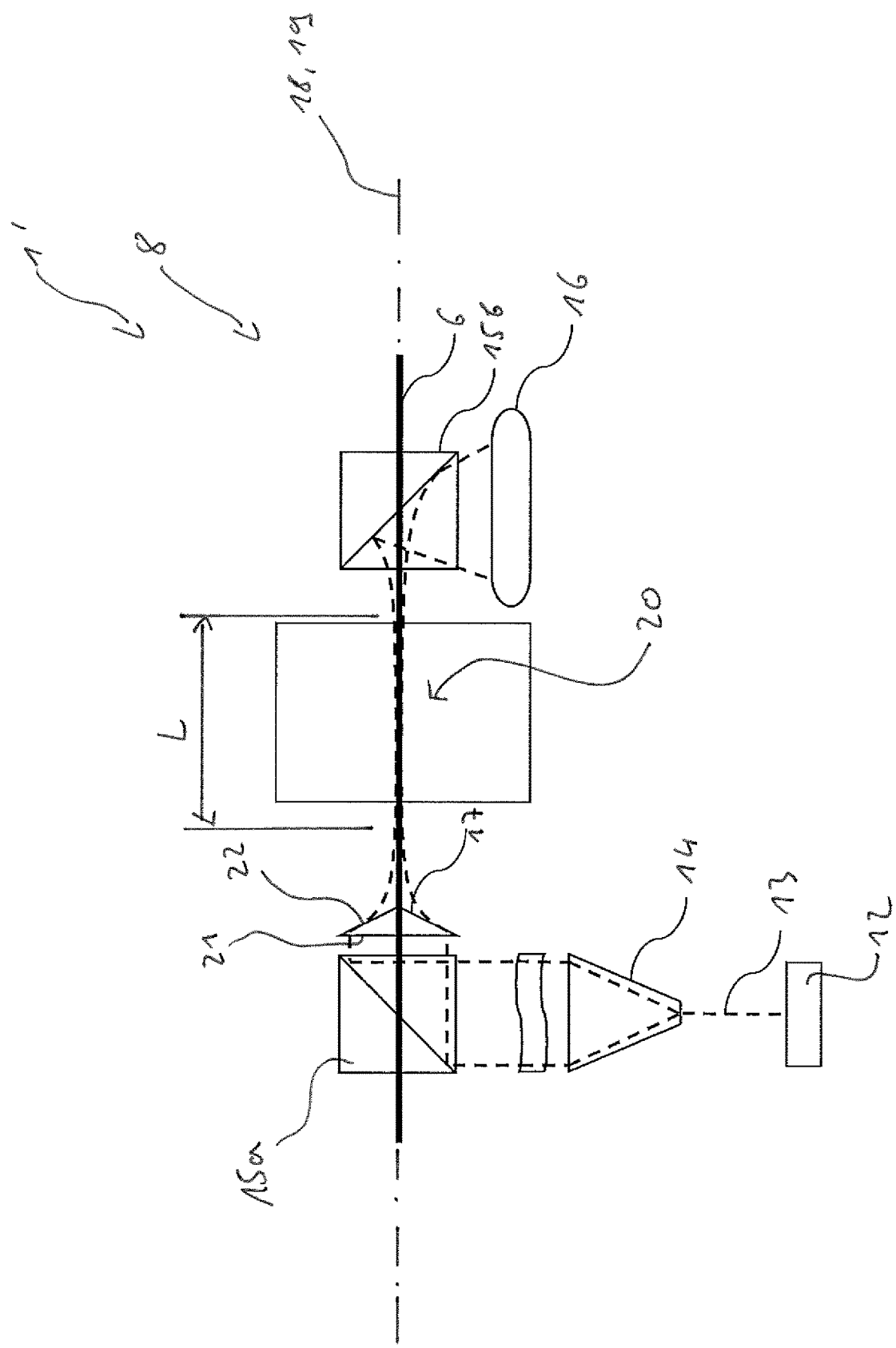

FIG. 3 shows a second embodiment of the interferometer 1. The interferometer 1' differs from the one shown in FIG. 1 by the axicon 17 being positioned such that the optical axis 18 of the axicon 17 is aligned with the probe beam 6 passing through the aerosol or gas sample 2. The axicon 17 may have a central aperture (not shown) extending along the optical axis 18 through the axicon 17.

In the embodiment of the interferometer 1' shown in FIG. 3 the optical axis 18 of the axicon 17 is identical to the interferometer axis 19.

In the following the method for measuring the light absorption of an aerosol or gas in the form of an aerosol or gas sample 2 by use of a photo-thermal interferometer 1, 1' is explained with reference to the FIGS. 1 to 3.

A laser beam 4 is emitted from the first laser source 3. The laser beam 4 is divided by a beam splitter 5 into a probe beam 6 and a reference beam 7.

The probe beam 6 is directed by the beam splitter 5 towards an aerosol or gas sample 2. The beam splitter 5 thus forms a first optical element. After having passed the aerosol or gas sample 2 the probe beam 6 reaches a mirror 9 and is reflected such that the probe beam 6 passes through the aerosol or gas sample 2 again and reaches the beam splitter 5. The beam splitter 5 directs the probe beam 6 onto the detector 10.

The reference beam 7 is directed by the beam splitter 5 to the mirror 11 and is reflected such that it passes through the beam splitter 5 and reaches the detector 10 also.

A second laser source 12 emits a pump beam 13 which is directed by second optical elements such as a beam expander 14 and a dichroic mirror 15a such that it overlaps at least partially with the probe beam 6 in the aerosol or gas sample 2.

One of the second optical elements is the axicon 17 which is chosen that it images the probe beam 13 into a longitudinally extended focal line on an optical axis 18 of the axicon 17. The axicon 17 is positioned such that the pump beam 13 overlaps with the probe beam 6 in the longitudinally extended focal line of the axicon 17.

The axicon 17 increases the pump beam 13 and probe beam 6 intensities integrated over a common tubular volume enveloping the beams 13, 6. This allows to increase the interaction area 20 along the beam propagation direction of the pump beam 13 and the probe beam 6 in which the pump beam 13 transfers its energy to the particles of the aerosol or gas sample 2, locally heats the ambient air around the particles and thus changes the refractive index of the air in the aerosol sample 2 or the absorbing gas within the gas sample 2. Moreover, the probe beam 6 passing the interaction area 20 is phase shifted due to the changed refractive index. The refractive index change is measured as a change in the phase shift between the reference beam 7 and the probe beam 6 which interfere with each other after having passed the beam splitter 5 thereby generating interference patterns which are recorded by the detector 10.

Based on the measured phase shift of the reference beam and the probe beam an aerosol or gas absorption coefficient may be calculated which is linearly related to the measured phase shift and only depends on the power of the second laser source, the pump-probe beam configuration geometry and the thermal properties of the air.

REFERENCE NUMERALS 1 interferometer
2 aerosol or gas sample
3 first laser source
4 laser beam (first laser source)
5 beam splitter
6 probe beam
7 reference beam
8 measurement chamber
9 mirror (probe beam)
10 detector
11 mirror (reference beam)
12 second laser source
13 pump beam
14 beam expander
15 a,b dichroic mirror
16 light trap
17 axicon
18 optical axis (axicon)
19 interferometer axis
20 interaction area
L length of interaction area
21 entry surface (axicon)
22 exit surface (axicon)
23 beam shaping optic

The invention claimed is:

1. A photo-thermal interferometer for measuring the light absorption of an aerosol or gas, comprising
a first laser source emitting a laser beam,
a beam splitter adapted to divide the laser beam into a probe beam and a reference beam,
at least one first optical element which is adapted to direct the probe beam such that it passes through the aerosol or gas and interferes with the reference beam thereafter thereby causing interference patterns, a detector for detecting the interference patterns, a second laser source configured to emit a pump beam for transferring energy to the aerosol or gas and second optical elements adapted to direct the pump beam such that it overlaps with the probe beam at least partially in the aerosol or gas, characterized in that at least one of the second optical elements modifying the pump beam is an axicon.

2. A photo-thermal interferometer according to claim 1, characterized in that the axicon is arranged to modify the pump beam such that it is imaged into a longitudinally extended focal line on an optical axis of the axicon and, that the axicon is positioned such that the pump beam overlaps with the probe beam in the longitudinally extended focal line of the axicon.

3. A photo-thermal interferometer according to claim 1, characterized in that the axicon is positioned outside of an interferometer axis along which the probe beam passes through the aerosol or gas.

4. A photo-thermal interferometer according to claim 1, characterized in that the axicon has an optical axis and is positioned such that the optical axis is aligned with the probe beam passing through the aerosol or gas.

5. A photo-thermal interferometer according to claim 4, characterized in that the axicon has a central aperture extending along its optical axis through the axicon.

6. A photo-thermal interferometer according to claim 1, characterized in that the axicon comprises an entry surface through which the pump beam enters the axicon and an exit surface through which the pump beam exits the axicon, wherein the entry surface or the exit surface has the shape of a cone or a truncated cone.

7. A photo-thermal interferometer according to claim 6, characterized in that a mask is positioned in front of the axicon such that part of the pump beam is blocked before entering the axicon.

8. A photo-thermal interferometer according to claim 1, characterized in that a diffuser is positioned in front of the axicon such that the pump beam after passing the diffuser enters the axicon.

9. A photo-thermal interferometer according to claim 1, characterized in that the axicon is a non-imaging Fresnel-lens.

10. A photo-thermal interferometer according to claim 1, characterized in that the second optical elements are further adapted to improve overlap of the pump beam with the probe beam.

* * * * *